US 9,303,806 B2

(12) United States Patent
Burton et al.

(10) Patent No.: US 9,303,806 B2
(45) Date of Patent: Apr. 5, 2016

(54) CLOSURE ASSEMBLY FOR PIPE END

(75) Inventors: Mark Burton, Kendal (GB); Adam Thistlethwaite, Kendal (GB); Craig Todd, Kendal (GB); Alex Butler, Kendal (GB)

(73) Assignee: Furmanite Worldwide, Inc., Houston, TX (US)

( * ) Notice: Subject to any disclaimer, the term of this patent is extended or adjusted under 35 U.S.C. 154(b) by 98 days.

(21) Appl. No.: 13/988,991

(22) PCT Filed: Nov. 16, 2011

(86) PCT No.: PCT/GB2011/001612
§ 371 (c)(1),
(2), (4) Date: May 22, 2013

(87) PCT Pub. No.: WO2012/069778
PCT Pub. Date: May 31, 2012

(65) Prior Publication Data
US 2013/0248037 A1    Sep. 26, 2013

(30) Foreign Application Priority Data
Nov. 23, 2010    (GB) ................................ 1019784.6

(51) Int. Cl.
*F16L 55/10* (2006.01)
*F16L 55/11* (2006.01)
*F16L 55/115* (2006.01)

(52) U.S. Cl.
CPC ............... *F16L 55/11* (2013.01); *F16L 55/115* (2013.01)

(58) Field of Classification Search
USPC .......................................... 138/89, 90, 96 R
See application file for complete search history.

(56) References Cited

U.S. PATENT DOCUMENTS

| 2,334,303 A | * | 11/1943 | Allen et al. ..................... 73/46 |
| 2,873,764 A | * | 2/1959 | Lombard et al. ................ 138/90 |
| 3,326,243 A | * | 6/1967 | Augustus ........................ 138/90 |

(Continued)

FOREIGN PATENT DOCUMENTS

| DE | 1053890 B | 3/1959 |
| DE | 8906997 U1 | 7/1989 |

(Continued)

OTHER PUBLICATIONS

UK IPO, Search Report issued Feb. 17, 2011 in corresponding British Patent Application No. GB1019784.6 (3 pages).

(Continued)

*Primary Examiner* — James Hook
(74) *Attorney, Agent, or Firm* — The Culbertson Group, PC

(57) ABSTRACT

A closure assembly for terminating an end of a pipe (4) has an end-cap (4) holding and having fluid-tight connection to a mutually coaxial cylindrical plug (2) and circular collar (3). The plug (2) and the collar (3) are configurable between respective engaged and disengaged configurations and mutually spaced to provide an annular space therebetween when the plug (2) and collar (3) are in their disengaged configurations. The annular space is arranged to receive an end of a pipe (1) arranged coaxially with the plug (2) and collar (3), the plug (2) and collar (3) being respectively slidable into and over the end of the pipe (1). The plug (2), when in its engaged configuration, grips the inner face of said pipe (41) and to provide a fluid tight seal and the collar (3), when in its engaged configuration, grips the outer face of the pipe (1) and to provide a fluid tight seal.

24 Claims, 3 Drawing Sheets

(56) References Cited

U.S. PATENT DOCUMENTS

| | | | | |
|---|---|---|---|---|
| 3,765,560 A | * | 10/1973 | Kemp | 138/90 |
| 3,844,313 A | * | 10/1974 | Arnold | 138/90 |
| 4,080,799 A | | 3/1978 | Nanny | |
| 4,415,005 A | * | 11/1983 | Janzen | 138/96 T |
| 8,573,655 B2 | * | 11/2013 | Carson | 285/415 |
| 2010/0320747 A1 | | 12/2010 | Takahashi | |

FOREIGN PATENT DOCUMENTS

| | | |
|---|---|---|
| EP | 1191272 A2 | 3/2002 |
| GB | 2448036 A | 10/2008 |
| WO | 2005057075 A1 | 6/2005 |

OTHER PUBLICATIONS

PCT, International Search Report dated Jan. 17, 2012, for PCT Application No. PCT/GB2011/001612 (4 pages).

PCT, Written Opinion of the International Searching Authority dated May 28, 2013, for PCT Application No. PCT/GB2011/001612 (5 pages).

* cited by examiner

CLOSURE ASSEMBLY FOR PIPE END

FIELD

The present invention relates to closure assemblies for use in terminating pipe ends in order to prevent fluid leakage from the terminated pipe ends in a variety of fields. The invention is of particular use for pipes which may hold fluid under pressure after being closed, in particular in situations where multiple redundancies of closure seals are desirable in order to reduce risk of failure and undesired leakage of fluid from a terminated pipe end for a pipe holding fluid under pressure.

In particular, the invention is of use as a closure assembly for ends of underwater pipes, such as undersea pipelines, for instance oil or gas pipelines. The invention is particularly useful in situations where a section of pipe may have to be removed, for instance to remove defective components, and the remaining pipe ends securely terminated to prevent leakage when the pipeline is re-pressurised.

BACKGROUND

Pipe end closure assemblies are known. These are typically in the form of a plug arranged to slide into a pipe end, and provided with a means for securing the plug into the pipe end whereby the plug grips the inner wall of the pipe and also forms a seal between the plug body and the inner wall of the pipe.

A typical prior art closure assembly may have a tapped rod extending through a tubular plug providing a gripping and sealing assembly, the tapped rod provided with a plate for fitting inside the pipe at its distal end and passing through a bush in an end-cap at its proximal end, the plate and end-cap sandwiching the tubular plug. A nut on the proximal end may be tightened to force the plate and end-cap towards each other, in order to squeeze the tubular plug in use after insertion of the distal end of the closure assembly into the pipe end. The closure assembly may be slid into an open pipe end in an un-squeezed arrangement, distal end first, and then one or more elastomeric washer seals, gripping rings and/or anti-extrusion means for the seals of the tubular plug may be urged radially outwards against the inner wall. For instance, the elastomeric washer will be squeezed radially outwards to form a seal against the inner face of the pipe, and inverse collet arrangements may be used to cause the gripping means and/or anti-extrusion means to expand radially when axially compressed, in order to enable the closure assembly to grip the inner wall of the pipe and to prevent undesired extrusion of elastomer.

One problem with such prior art arrangements is that they are tightened to grip and seal by screwing, and this may require high torques to be applied to the closure assembly. This may be difficult to achieve in hostile environments such as the undersea environment, where human divers, manned undersea vehicles or remotely operated undersea vehicles may be needed to put the closure assembly in place. There is also a risk that the torque applied to the pipe end as the nut is tightened to form the seal may result in damage to the pipe, weakening it, breaking it or increasing risk of future breakage.

Another problem with the prior art apparatus and methods is that the terminated pipe end may be subject to extremely high forces acting radially outwards from the central axis of the assembly where the plug is squeezed against the inner face of the pipe. The pipe walls may thus be subject to continuous bending or shear stresses after the closure assembly has been put in place to terminate a pipe end, and this may eventually give rise to fatigue stress cracking or fracture of the pipe.

Furthermore, there is limited multiple redundancy, to protect against seal failure of seal or gripping means, built into the prior art arrangements. Although multiple seals or multiple gripping collets may be used to provide a back-up in case one seal or gripping means fails, the length of the tubular plug may be limited by the desire to reduce the torque required to tighten the plug, and so multiple redundancies may be limited. Also, any failure arising from, for instance, unevenness of the inner face of the pipe, is likely to give rise to failure in the secondary seal/grip if it gives rise to failure in a primary seal/grip, and so independence of alternative seals and gripping means is desirable.

Hence there is a need for a closure assemblies and closure methods for providing fluid-tight termination of pipe ends, capable of withstanding high pressure differences across the termination, particularly for pipe ends in hostile environments, which address or overcome some or all of the problems in the prior art.

SUMMARY OF THE INVENTION

It is one object of the invention, amongst others, to provide a closure assembly, particularly a closure assembly suitable for fitting to a pipe end in hostile conditions, which may be easily fitted to provide a fluid-tight termination at the pipe end and which has multiple redundancy in case of partial failure. It is a further object of the invention to provide a closure assembly which may be locked into place on a pipe end without excessive application of torque to the pipe end. It is a further object of the invention to provide a closure assembly and method which does not require excessive shear stress to be applied to the pipe either during fitting of the closure assembly, or once the closure assembly is left in place providing a fluid-tight seal.

A first aspect of the invention provides a closure assembly for terminating an end of a pipe, the closure assembly comprising;
an end-cap holding and having fluid-tight connection to a mutually coaxial cylindrical plug and circular collar,
the plug and the collar being configurable between respective engaged and disengaged configurations and mutually spaced to provide an annular space therebetween when the plug and collar are in their disengaged configurations,
the annular space arranged to receive an end of a pipe arranged coaxially with the plug and collar, the plug and collar being respectively slidable into and over said end of said pipe in use,
the plug, when in its engaged configuration, configured to grip an inner face of said pipe and to provide a fluid tight seal against said inner face of said pipe,
the collar, when in its engaged configuration, configured to grip an outer face of said pipe and to provide a fluid tight seal against said outer face of said pipe.

A second aspect of the invention provides a method of providing a fluid-tight termination at an end of a pipe having an inner face and an outer face, the method comprising:
providing a closure assembly according to the first aspect of the invention and configured to have an annular space adapted to receive the end of the pipe when the plug and collar are in their respective disengaged configurations,
sliding the plug and collar of the closure assembly, each in their disengaged configurations, respectively into and over the end of the pipe whereby the pipe is positioned within the annular space of the closure assembly, configuring the plug into its engaged configuration to grip the inner face of the pipe and to provide a fluid tight seal against the inner face of the pipe, and configuring the collar into its engaged configuration to grip the outer face of the pipe and to provide a fluid tight seal against the outer face of the pipe, whereby the closure assembly provides fluid-tight termination of the pipe end.

DETAILED DESCRIPTION OF THE INVENTION

Throughout this specification, the term "comprising" or "comprises" means including the component(s) specified but not to the exclusion of the presence of others. The term "consisting essentially of" or "consists essentially of" means including the components specified but excluding other components except for components present for an incidental purpose other than that of achieving the technical effect of the invention. Whenever appropriate, the use of the term "comprises" or "comprising" may also be taken to include the meaning "consists essentially of" or "consisting essentially of".

Throughout the specification, the term "axial" refers to the long axis of tubular, cylindrical, annular, circular or toroidal components, such as rings, where the long axis is normal to the circular cross-sectional plane of the components, passing through the respective centroid. The term "radial" means along a radius of such a component, normal to the long axis, either in a direction towards, or away from the long axis.

The term "pipe" as used herein means a substantially cylindrical hollow tube having an inner face which is circular in cross section and an outer face, also substantially circular in cross section.

The term "collet", "collet arrangement" or "inverse collet" as used herein refers to a pair of coaxial rings, one of which is a solid ring and the other a split ring with its separate segments typically held in place by a resilient means. The coaxial rings are arranged so that when the rings are pushed together (i.e. axially compressed), the solid ring urges the split ring to expand radially outwards or inwards depending upon the detailed arrangement. Hence, the axial movement of the solid ring relative to the split ring results in the segments of the split ring being urged radially. The split rings may be held in place by resilient means such as spring assemblies or elastomeric bands. Such arrangements are known in the field for use in provision of gripping means or for providing anti-extrusion means for use in combination with elastomeric sealing washers. Details of such arrangements are shown in the Figures below and described in connection with the Figures.

In this specification, the term "fluid" includes both liquids and gases. By "fluid-tight" as referred to a seal it is meant that the seal permits substantially no fluid passage across the seal up to a pressure difference of at least 5 MPa, preferably up to at least 10 MPa, more preferably up to at least 12 MPa, or even more preferably up to at least 25 MPa.

The term "hostile conditions" mean conditions where a human being cannot safely work for extended periods without wearing body protection, such as gloves, full body suits, or the like, to provide protection from bodily damage. Typical hostile conditions include, underwater, undersea, environments of extreme cold, extreme heat or high radiation levels.

The first aspect of the invention provides a closure assembly for terminating an end of a pipe. The closure assembly comprises an end-cap holding and having fluid-tight connection to a mutually coaxial cylindrical plug and circular collar. The plug and the collar are each configurable between respective engaged and disengaged configurations and are mutually spaced to provide an annular space between them when the plug and collar are in their disengaged configurations.

Hence, when the plug and collar are both in their disengaged configurations, the annular space between them is arranged to receive an end of a pipe. In order to fit into the annular space, the axis of the pipe should be arranged coaxially with the plug, collar, and hence coaxially with the annular space. This allows the plug and collar to respectively slide into and over the end of the pipe.

The plug, when in its engaged configuration, is configured to grip the inner face of the pipe (when the pipe of suitable size is in place in the annular space) and to provide a fluid tight seal against the inner face of the pipe.

Similarly, the collar, when in its engaged configuration, is configured to grip the outer face of the pipe (when a pipe of suitable size occupies the annular space) and to provide a fluid tight seal against said outer face of said pipe. It will be evident that the opposed radial forces applied by the plug when engaged (pushing radially outwards against the inner face of the pipe to form an inner seal) and the collar when engaged (pushing radially inwards against the outer face of the pipe to form an outer seal) may be arranged in this invention to counteract each other whilst providing excellent grip and seal at both the inner and outer faces of the pipe. This arrangement may reduce overall bending or shear stress on the walls at the pipe end once the closure assembly is in place providing a fluid tight termination resistant to high pressure differences across the termination.

Furthermore the presence of a sealing and gripping arrangement both inside the pipe end (between the plug and the pipe inner face) and outside the pipe end (between the collar and the pipe outer face) provides multiple redundancies in the event that either the seal or grip at either the inner or the outer face of the pipe fails. The closure assembly of the invention also effectively provides a fluid tight warning space between the end-cap, the plug, the collar and the seals at the inner and outer faces of the pipe. In the event that the inner face seal leaks, the warning space will fill with fluid from the interior of the pipe, passing the inner face seal and so pressurise the warning space. The closure assembly may suitably be provided with a pressure monitor means which may be used to detect whether the inner face seal has ruptured. By monitoring (for instance wired monitoring or remote, wireless monitoring) of the pressure in the warning space, partial failure of the closure assembly may be detected at an early stage, before the outer seal fails and a substantial leakage of fluid from the terminated pipe end occurs. This warning arrangement will function for a failure of the inner face seal. The warning space may also be used for intermittent monitoring of the outer face seal condition, for instance by providing a means for pressurising the warning space so that intermittent monitoring of the security of the outer seal may be undertaken. If the seal has failed, the warning space will be unable to hold the applied pressure.

Preferably, the plug and collar are individually (i.e. separately) configurable between their respective engaged and disengaged configurations.

For example, the plug may comprise a central housing carrying a first coaxial tubular engagement assembly extending axially between a distal flange of the central housing and an engagement face of the end-cap, and positioned between the outer face of the central housing and the inner face of the pipe in use, wherein the first coaxial tubular engagement assembly, when axially compressed, is configured to grip and seal to the outer face of the central housing and to grip and seal to the inner face of the pipe, whereby configuration of the plug from its disengaged to its engaged configuration is actuated by axial movement of the central housing towards the end-cap whereby axial compression of the first tubular engagement assembly between the distal flange and the engagement face of the end-cap is achieved.

A hydraulically operable plug drive piston assembly may be arranged to axially position the central housing relative to the end-cap whereby the plug is configurable between its engaged and disengaged configurations. The plug drive piston assembly may suitably comprise a flanged plug actuation piston housed in a plug piston cylinder housing of the end-cap and operably connected to the central housing of the plug for instance by a threaded connection rod mating with a tapped bore in the central housing. The plug piston cylinder housing may be located in a central body of the end-cap. By application of hydraulic pressure to either side of the flange, the plug actuation piston may be driven along the plug piston cylinder housing, either axially towards or away from the end-cap to provide engaged and disengaged configurations respectively for the plug, by axially compressing or releasing the first tubular engagement means between the distal flange and the engagement face of the end-cap.

The use of hydraulic pressure to achieve engagement or disengagement of the plug is advantageous in that it does not require torque to be applied to the closure assembly or pipe end. Self-sealing hydraulic connection valves are suitably provided in the closure assembly to permit connection of hydraulic pressure lines to operate the plug drive piston assembly.

Preferably, a plug locking means may be provided as part of the closure assembly, arrangeable to hold the central housing and the end-cap positioned relative to each other whereby the plug is held in its engaged configuration. For instance, the drive plug piston assembly may be used to bring the plug in use into its engaged configuration, to provide gripping and sealing against the inner face of the pipe by application of hydraulic pressure to the distal side of the flange of the plug actuation piston. Whilst the plug drive piston is still pressurised to hold the plug in its engaged position, the plug locking means may be engaged to fix the relative axial positions of the plug and the end-cap, locking the plug in its engaged position. For instance a threaded plug locking nut may be arranged to mate with a threaded portion of the plug drive piston, the nut being tightened against the end-cap to hold the plug drive piston in place with plug in its engaged configuration. The plug locking nut may have external gearing, enabling it to be tightened or slackened by plug locking gear drive engaged with the gearing on the plug locking nut.

In a particularly suitable arrangement, hydraulic pressure lines may be attached to the closure assembly to provide hydraulic pressure to drive the plug drive piston to bring the plug to an axial position relative to the end-cap whereby the plug is in its engaged configuration. Whilst the plug is in the engaged configuration, the plug locking means may be arranged to fix the relative axial positions of plug and end-cap whereby the plug is locked in its engaged configuration. The hydraulic pressure may then be removed and hydraulic pressure lines detached, leaving the closure assembly locked in place on the pipe end. Removal of the closure assembly may be achieved by first applying hydraulic pressure to the plug drive piston in order to free the locking means to allow it to be disengaged. Hydraulic pressure may then be applied to the plug drive piston in a manner to drive the plug to its disengaged position.

The first coaxial tubular engagement assembly suitably comprises one or more elastomeric washers, each arranged to provide a fluid tight seal between the outer face of the central housing and the inner face of the pipe in use, when axially compressed. An advantage of using two or more elastomeric washers is that the space between them can be used to independently test the security of the seals by provision of provided suitable pressure ports between the elastomeric washers. There is an additional level of redundancy due to the presence of multiple seals provided by multiple elastomeric washers.

Preferably, the first coaxial tubular engagement assembly may further comprise anti-extrusion assemblies at distal and proximal faces of each elastomeric washer.

The first coaxial tubular engagement assembly may suitably comprise one or more collet assemblies, acting as gripping means, each arranged to radially expand when axially compressed, whereby the inner face of the pipe is gripped in use. As the inner part of the collet assembly is a solid ring, axial loads are transferred by friction between the pipe inner face and the split ring of each collet assembly, then by friction and the angled reaction forces between the split and non-split rings of the collet assemblies, and primarily by the axial reaction forces through all the seal components, to bear upon the distal end of the plug and thence back to the end cap.

The collar preferably carries a second coaxial tubular engagement assembly extending axially between a distal rim of the collar and the engagement face of the end-cap, and positioned at an inner face of the collar between the collar and the outer face of the pipe in use, wherein the second coaxial tubular engagement assembly, when axially compressed, is configured to grip and seal to the outer face of the pipe, and wherein configuration of the collar from its disengaged to its engaged configuration is actuated by axial movement of the collar towards the end-cap whereby axial compression of the second tubular engagement assembly between the distal rim of the collar and the inner face is achieved. Axial loads are transferred through the collar seal components to the distal rim of the collar, thence to the collar itself, the locking device and finally into the end cap.

Suitably, a hydraulically operable piston drive arrangement is configured to axially position the collar relative to the end-cap whereby the collar is configurable between its engaged and disengaged configurations.

The collar piston drive assembly, operably connected to the collar, may suitably comprise an annular collar piston flange located on the inner face of the collar and housed, for instance, in an annular collar piston housing between the collar and the central body of the end-cap. By application of hydraulic pressure to either side of the collar piston flange, the collar may be driven axially along the annular collar piston housing relative to the end-cap to configure the collar into its engaged and disengaged configurations respectively, by axially compressing or releasing the second tubular engagement means between the distal rim of the collar and the engagement face of the end-cap.

The use of hydraulic pressure to achieve engagement or disengagement of the collar is advantageous in that it does not require torque to be applied to the closure assembly or to the pipe end. Self-sealing hydraulic connection valves are suitably provided in the closure assembly to permit connection of hydraulic pressure lines to operate the collar piston drive assembly.

A collar locking means may be provided which is arrangeable to hold the collar and the end-cap positioned relative to each other whereby the collar is held in its engaged configuration. For instance, the collar piston drive assembly may be used to bring the collar, in use with a pipe end, into its engaged configuration, to provide gripping and sealing against the outer face of the pipe by application of hydraulic pressure to the distal side of the annular collar piston flange. Whilst the collar piston drive is still pressurised to hold the plug in its engaged position, the collar locking means may be engaged to fix the relative axial positions of the collar and the end-cap, locking the collar in its engaged position. For instance a threaded collar locking ring may be arranged to mate with a threaded portion of the outside of the collar, the collar locking ring being tightened against the end-cap to hold the collar in place when the collar is in its engaged configuration. The collar locking ring may have external gearing, enabling it to be tightened against the end-cap, or slackened by collar locking gear drive engaged with the gearing on the collar locking ring.

In a particularly suitable arrangement, hydraulic pressure lines may be attached to the closure assembly to drive the collar piston flange to bring the collar to an axial position relative to the end-cap whereby the collar is in its engaged configuration. Whilst the collar is in the engaged configuration, the collar locking means may be arranged to fix the relative axial positions of collar and end-cap whereby the collar is locked in its engaged configuration in use to grip the outer face of a pipe end. The hydraulic pressure may then be removed and hydraulic pressure lines detached, leaving the closure assembly locked in place on the pipe end. Removal of the closure assembly may be achieved by first applying hydraulic pressure to the collar piston flange in order to free the collar locking means to allow it to be disengaged. Hydraulic pressure may then be applied to the collar piston flange in a manner to drive the collar to its disengaged position.

The second coaxial tubular engagement assembly of the collar may comprise one or more elastomeric washers, each arranged to provide a fluid tight seal between the inner face of the collar and the outer face of the pipe in use, when axially compressed. An advantage of using two or more elastomeric washers is that the space between them can be used to independently test the security of the seals by provision of provided suitable pressure ports between the elastomeric washers. There is an additional level of redundancy due to the presence of multiple seals provided by multiple elastomeric washers.

Preferably, the second coaxial tubular engagement assembly comprises anti-extrusion assemblies at distal and proximal faces of each elastomeric washer.

The second coaxial tubular engagement assembly may comprise one or more collet assemblies, as gripping means, each arranged to radially expand when axially compressed, whereby the inner face of the collar and the outer face of the pipe are gripped in use.

Preferably, each collet assembly of the first coaxial tubular engagement assembly is substantially aligned with a collet assembly of the second coaxial tubular engagement assembly. This preferred configuration leads to minimal radial shearing stress being applied to the pipe walls when the closure assembly is in place with the plug and collar engaged. The forces applied to the pipe wall by the collar radially inwards and by the plug radially outward are substantially aligned so that compressive stress, rather than shear stress, is produced between them at the pipe wall.

The second aspect of the invention provides a method of providing a fluid-tight, pressure resistant termination at an end of a pipe having an inner face and an outer face, the method comprising: providing a closure assembly according to the first aspect of the invention, and configured to have an annular space adapted to receive the end of the pipe when the plug and collar are in their respective disengaged configurations, sliding the plug and collar of the closure assembly, each in their disengaged configurations, respectively into and over the end of the pipe whereby the pipe is positioned within the annular space of the closure assembly, configuring the plug into its engaged configuration to grip the inner face of the pipe and to provide a fluid tight seal against the inner face of the pipe, and configuring the collar into its engaged configuration to grip the outer face of the pipe and to provide a fluid tight seal against the outer face of the pipe, whereby the closure assembly provides fluid-tight termination of the pipe end.

By pressure resistant it is meant that the termination can maintain fluid-tight termination with pressure differences across it, in use, of up to at least 5 MPa, preferably up to at least 10 MPa, more preferably up to at least 12 MPa, even more preferably up to at least 25 MPa.

The features as set out for the first aspect of the invention are also applicable, where appropriate, to the second aspect of the invention.

Preferably, the plug and collar are configured into their respective engaged configurations by hydraulically operated piston drives of the closure assembly actuated through hydraulic pressure lines operably connected to hydraulic inlet ports of the closure assembly.

Preferably, the plug and collar may be locked into their respective engaged configurations by respective plug and collar locking means of the closure assembly whereby the hydraulic pressure lines may be disconnected from the hydraulic inlet ports to leave the closure assembly providing fluid-tight termination of the pipe end. For instance, gear drives may be used to lock the plug and collar into their respective engaged configurations, but alternative arrangements for rotating and locking the plug and collar locking rings may be suitable.

The end of the pipe to be provided with a fluid-tight, pressure resistant termination may be located in a hostile environment as set out hereinbefore. For instance, the pipe end may be underwater, such as undersea. Another suitable hostile environment for use of the invention may be an environment where high radiation levels are present, such as in the environs of a nuclear reactor, for instance when repairs are needed and the use of manipulators or a remotely operated vehicle or robot for terminating a pipe end is highly desirable.

The method of the invention may suitably be carried out by remote operation, such as by a remotely operated undersea vehicle or robot, or by remotely operated manipulators, robots or the like in a radioactive environment.

BRIEF DESCRIPTION OF THE DRAWINGS

A specific embodiment of the present invention will now be described, by way of example only, with reference to the accompanying drawings in which.

DETAILED DESCRIPTION OF THE DRAWINGS

Figure 1:
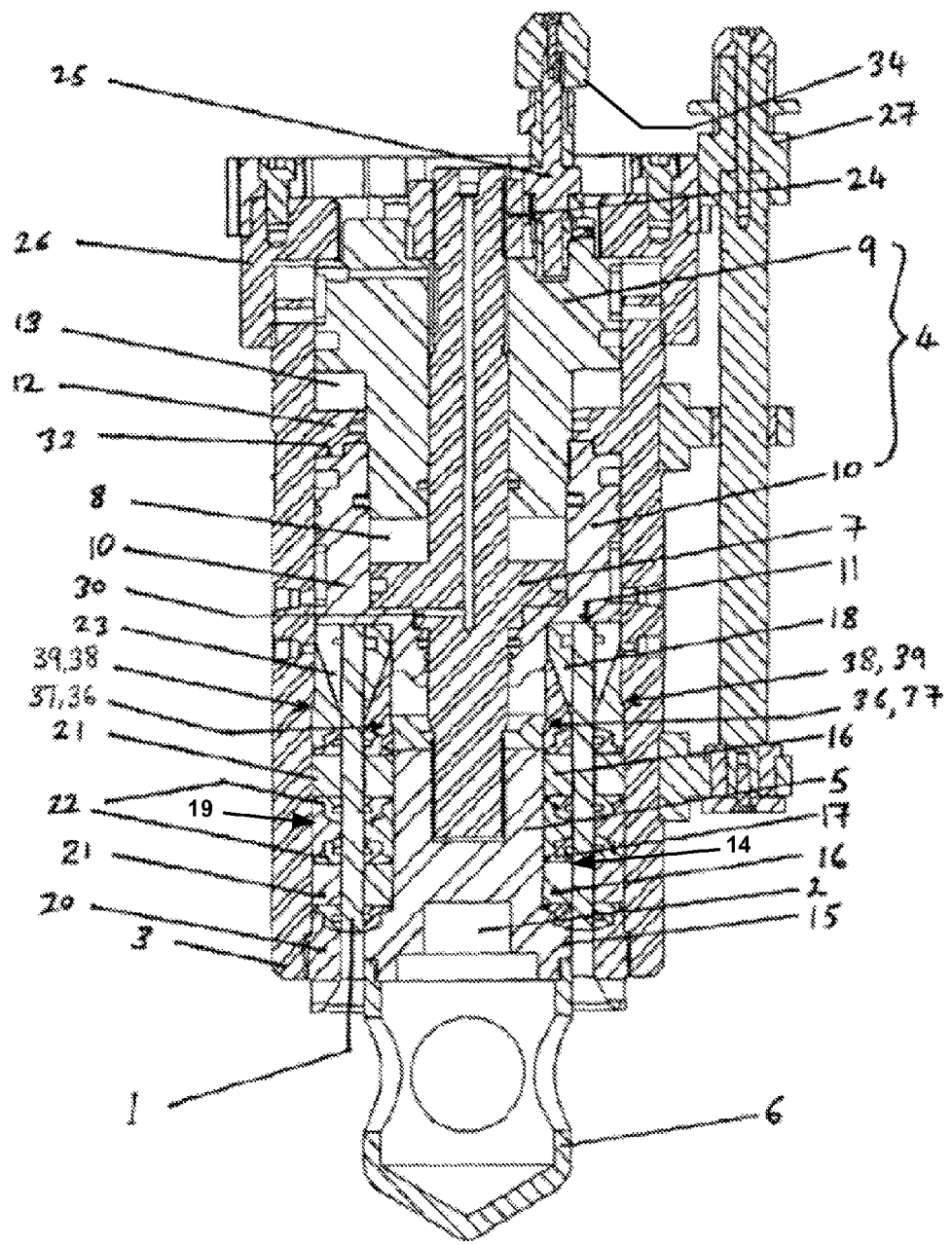
FIG. 1 shows a schematic cross-sectional view of a first embodiment of a closure assembly according to the first aspect of the invention, with the plug 2 and collar 3 both each in their disengaged configurations and with a pipe end 1 for termination located in the annular space between plug 2 and collar 3.

The Figures show a first embodiment of a closure assembly according to the invention having an end-cap 4 carrying a collar 3 and a plug 2 forming an annular space into which a pipe end 1 may be inserted when the plug 2 and collar 3 are in their disengaged configurations as shown in FIG. 1. In the specification, references to "proximal mean the direction away from the pipe end from the pipe (i.e. towards the top of the page in these Figures) and references to "distal" man in the direction away from the pipe end along the pipe (i.e. towards the bottom of the page in the Figures)

The plug 2 has a central housing 5 with an installation guide 6. The central housing 5 is attached by a screw arrangement to a flanged plug drive piston 7. This flanged plug drive piston 7 is located in a plug piston cylinder housing 8 formed as a space between first 9 and second 10 central body portions of the end-cap 4. The first 9 and second 10 body portions are separable and form the plug cylinder housing 8 between them, with the flanged plug drive piston 7 passing through a sealed bush in the distal end of the second body portion 10, this distal end also carrying the engagement face 11 of the end-cap 4.

The collar 3 is slidably mounted on the first 9 and second 10 body portions of the end-cap 4 and has an annular collar piston flange 12 located within an annular collar piston housing 13 formed between the first 9 and second 10 body parts of the end-cap 4 and the collar 3.

A first tubular coaxial engagement assembly 14 is located between the outer face of the plug central housing 5 and the inner face of the pipe 1, extending axially between the engagement face 11 of the end-cap 4 and a distal flange 15 of the plug central housing 5.

The first tubular coaxial engagement assembly 14 has two elastomeric washers 16 and four anti-extrusion assemblies 17 positioned at the distal and proximal faces of the washers 16. It also includes a collet assembly 18 between the engagement face 11 of end-cap 4 and one of the anti-extrusion assemblies 17.

The inner, solid ring of the collet assembly 18 is provided with a step 36 arranged to engage with a corresponding step 37 on the outer face of the plug central housing 5 when in the disengaged configuration as shown in FIG. 1. In the engaged configuration shown in FIG. 2, the two respective steps are spaced apart.

A second tubular coaxial engagement assembly 19 is located between the outer face of the pipe 1 and the inner face of the collar 3, extending axially between the engagement face 11 of the end-cap 4 and a distal rim 20 of the collar 3 which acts as a retaining rim to hold the second tubular coaxial engagement assembly 19 in place.

The second tubular coaxial engagement assembly 19 has two elastomeric washers 21 and four anti-extrusion assemblies 22 positioned at the distal and proximal faces of the washers 21. It also includes a collet assembly 23 between the engagement face 11 of end-cap 4 and one of the anti-extrusion assemblies 22.

The outer, solid ring of the collet assembly 23 is provided with a step 38 arranged to engage with a corresponding step 39 on the inner face of the collar 3 when in the disengaged configuration as shown in FIG. 1. In the engaged configuration shown in FIG. 2, the two respective steps are shown spaced apart.

The proximal end of the flanged plug drive piston 7 passes through a sealed bore in the first body portion 9 of the end-cap 4 and its threaded proximal end is fitted with a threaded plug locking nut 24 having external gear teeth arranged to engage with plug locking gear drive 25.

A threaded collar locking ring 26 mates it a threaded portion of the outer face of the proximal end of the collar 3. The collar locking ring 26 is provided with external gear teeth arranged to engage with collar locking gear drive 27.

Figure 3:
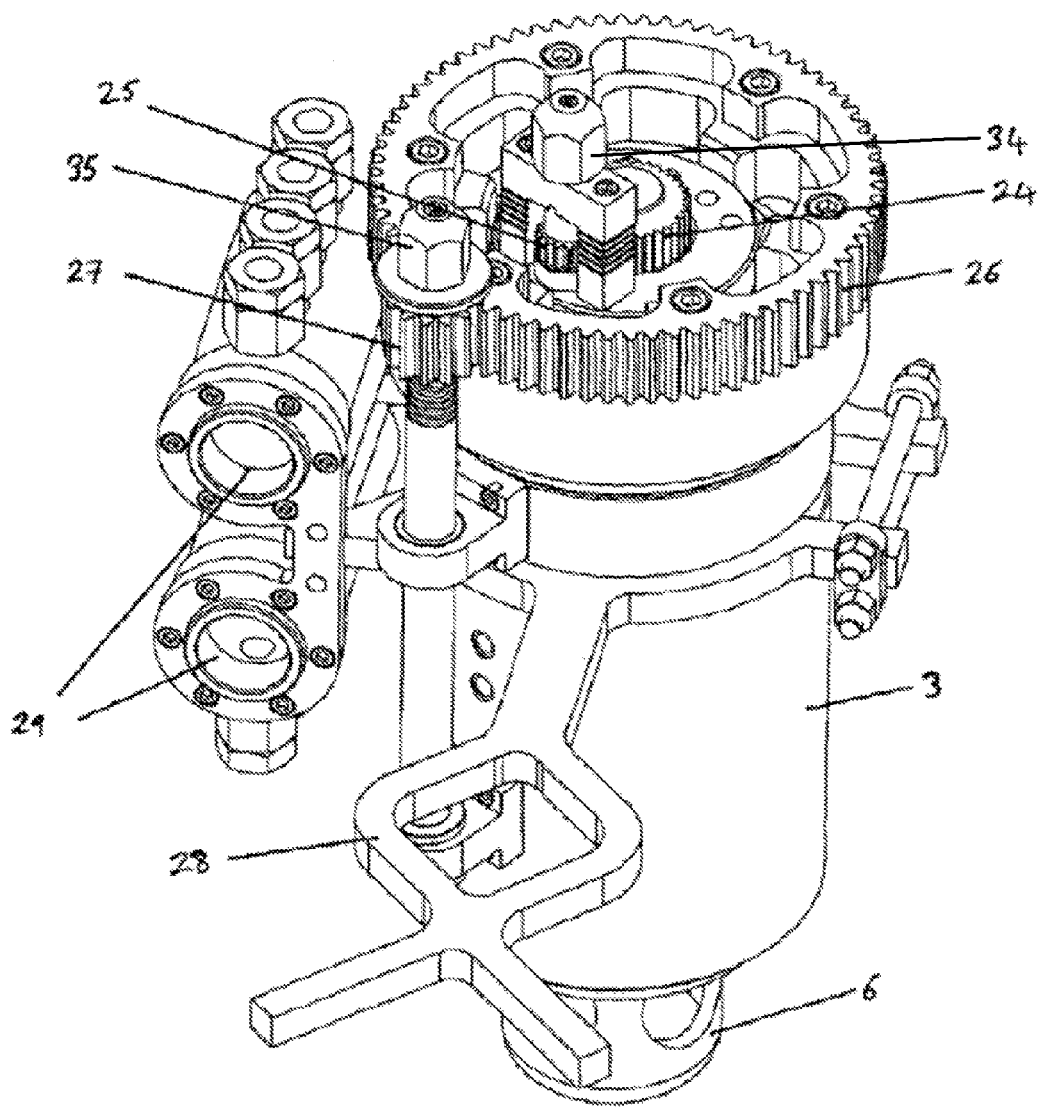
FIG. 3 shows a perspective view of the embodiment of FIGS. 1 and 2, with the pipe not shown and also showing a hydraulic connection manifold 29 and manipulator handle 28 to permit fitting of the closure assembly to a pipe 1 by use of a remotely operated vehicle (ROV).

The embodiment of the invention shown is adapted for installation and/or removal from a pipe end using a remotely operated vehicle (ROV). As shown in FIG. 3, the closure assembly is provided with a manipulator handle 28 suitable for grasping by an ROV. The plug locking gear drive 25 is fitted with a hexagonal nut 34 to be engaged by an ROV wrench tool for tightening or slackening the plug locking nut 24. The collar locking gear drive 27 is fitted with a hexagonal nut 35 to be engaged by an ROV wrench tool for tightening or slackening the collar locking ring 26.

Figure 2:
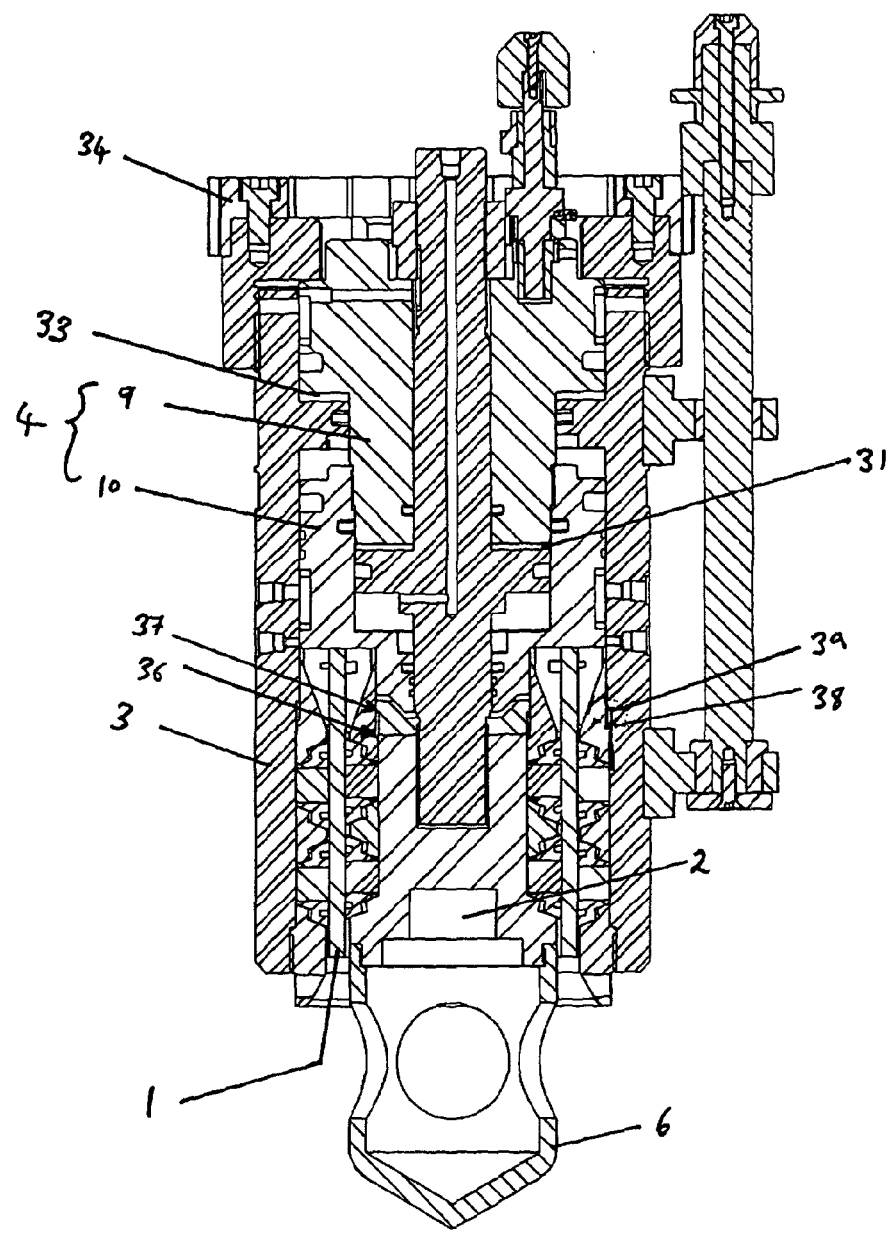
FIG. 2 shows a schematic cross section through the embodiment of FIG. 1 with the plug 2 and collar 3 each in their engaged configurations.

A hydraulic connection manifold 29 is provided to give easily achieved connection and disconnection of four hydraulic pressure lines to drive the collar and plug drive pistons 12, 7 for configuring the collar 3 and plug 2 between engaged and disengaged configurations. Details of the self-sealing hydraulic connection ports used for providing pressure to drive the piston drives are not shown in the Figures. In FIGS. 1 and 2, the locations pressurised to cause engagement of the plug, disengagement of the plug, engagement of the collar and disengagement of the collar are indicated by references 30, 31, 32 and 33 respectively.

In use, an ROV grasping the manipulator handle 28 is used to position and guide the connection assembly to slide it over the pipe 1 with the end of pipe 1 located in the annular space between collar 3 and plug 2, each in their disengaged configurations. The end of the pipe 1 may abut the engagement face (i.e. distal face) 11 of the end-cap 4.

Hydraulic pressure is applied at location 30 to drive the flanged plug drive piston 7, pulling the central housing 5 with its distal flange 15 towards the end-cap 4. This results in the first tubular coaxial engagement assembly 14 being axially compressed, leading to the collet assembly 8 expanding radially to grip the outer face of the central housing 5 and the inner face of pipe 1. Similarly, the elastomeric washers 16 and seal anti-extrusion assemblies 17 are forced to radially expand to provide a fluid-tight seal between the central housing 5 and the inner face of pipe 1.

The movement of the flanged plug drive piston 7 also causes its proximal end to move, carrying plug locking nut 24 away from the proximal face of the first body portion 9 of end-cap 4. A wrench tool of the ROV is used to rotate hexagonal nut 34 to rotate plug locking drive gear 25, tightening tighten the plug locking nut 24 along the plug drive piston 7 to tighten it against the proximal face of the first body portion 9 of end-cap 4. Once this has happened, the hydraulic pressure applied at location 30 may be released, leaving the plug locking nut 24 holding the plug locked in its engaged position gripping and sealing the plug 5 to the inner face of the pipe 1.

For the collar 3, hydraulic pressure is applied at location 32 to drive the collar piston flange 12, pulling the collar 3 with its distal rim 20 towards the end-cap 4. This results in the second tubular coaxial engagement assembly 19 being axially compressed between the engagement face 11 of end-cap 4 and the distal rim 20 of collar 3, leading to the collet assembly 8 expanding radially to grip the outer face of the central housing 5 and the inner face of pipe 1. Similarly, the elastomeric washers 21 and seal anti-extrusion assemblies 22 are forced to radially expand to provide a fluid-tight seal between the collar 3 and the outer face of pipe 1.

The movement of the flanged piston collar 12 causes its proximal end to move, carrying collar locking ring 26 away from the proximal face of the first body 9 of end-cap 4. A wrench tool of the ROV is used to rotate hexagonal nut 35 to, in turn, rotate collar locking drive gear 27, tightening the collar locking ring 26 along the threaded exterior of the collar to tighten the collar locking ring against the proximal face of the first body 9 of end-cap 4. Once this has happened, the hydraulic pressure applied at location 32 may be released, leaving the collar locking ring 26 holding the collar 3 locked in its engaged position gripping and sealing the collar 3 to the outer face of the pipe 1.

The ROV can then disconnect any hydraulic pressure lines from the hydraulic connection manifold 29 and disengage from the closure assembly to leave the closure assembly of the invention locked in place, securely terminating the pipe end to prevent fluid leakage.

In order to release and detach the closure assembly from the pipe end, an ROV first makes hydraulic connection with the hydraulic connection manifold 29. Hydraulic pressure is again applied at location 32 to enable the collar locking ring to disengage from the proximal face of the first body 9 of the end-cap 4 by relieving compressive stress at the interface between them. The ROV may then engage hexagonal nut 34 to slacken collar locking ring. Hydraulic pressure at location 32 may then be released, and hydraulic pressure applied at location 33 to cause the second tubular engagement means 19 to relax axially and to release its grip and seal on the outer face of pipe 1 as the collar 5 releases its axial compression as it is slid in a distal direction away from the end-cap 4. The step 39 in the inner face of the collar 3 engages step 38 of the solid ring of the collet arrangement 23 to act to slide the solid and segmented collet rings of collet arrangement 23 apart, releasing the radial gripping force against the outer face of the pipe 1

Similarly, hydraulic pressure is applied at location 30, once more, to relieve stress at the locking interface between the plug locking nut 24 and the proximal face of first body 9 of the end-cap 4. This will permit the ROV, engaging a wrench tool with hexagonal nut 35, to slacken the plug locking nut 24. The hydraulic pressure at location 30 may then be released, and replaced by hydraulic pressure applied at location 31, driving the plug drive piston 7 and connected plug 5 to slide in a distal direction, away from the end-cap, releasing the axial compression applied to the first tubular engagement means 14 and so allowing it to relax to release its grip and seal on the inner face of pipe 1. The step 37 in the outer face of the plug central housing 5 engages step 36 of the solid ring of the collet arrangement 18 to act to slide the solid and segmented collet rings of collet arrangement 18 apart, releasing the radial gripping force against the inner face of the pipe 1

All hydraulic pressure is then released and the ROV disconnects the hydraulic lines from the manifold 29. The ROV grasps manipulation handle 28 and slides the closure assembly off the pipe end for removal.

It will be appreciated that numerous modifications to the above described embodiment may be made without departing from the scope of the invention as defined in the appended claims. For example, the closure apparatus may be provided with pressure monitors for measurement and detection of fluid pressures in order to assess whether leakages of fluid have occurred between the primary seal at the inner face of the pipe and the secondary seal at the outer face of the pipe.

The ROV may, for instance, be arranged to drive the plug 5 and collar 3 into their engaged configurations substantially simultaneously, rather than sequentially, in order to reduce risk of fracture of the pipe wall arising from shear stresses arising during attachment of the closure assembly to the pipe end.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A closure assembly for terminating an end of a pipe, the closure assembly comprising:
    an end-cap holding and having fluid-tight connection to a mutually coaxial cylindrical plug and circular collar,
    the plug and the collar being configurable between respective engaged and disengaged configurations and mutually spaced to provide an annular space therebetween when the plug and collar are in their disengaged configurations,
    the annular space arranged to receive an end of a pipe arranged coaxially with the plug and collar, the plug and collar being respectively slidable into and over said end of said pipe in use,
    the plug, when in its engaged configuration, configured to grip an inner face of said pipe and to provide a fluid tight seal against said inner face of said pipe,
    the collar, when in its engaged configuration, configured to grip an outer face of said pipe and to provide a fluid tight seal against said outer face of said pipe;
    wherein the plug comprises a central housing carrying a first coaxial tubular engagement assembly extending axially between a distal flange of the central housing and an engagement face of the end-cap, and positioned between the outer face of the central housing and said inner face of said pipe in use, wherein the first coaxial tubular engagement assembly, when axially compressed, is configured to grip and seal to said inner face of said pipe, whereby configuration of the plug from its disengaged to its engaged configuration is actuated by axial movement of the central housing towards the end-cap whereby axial compression of the first tubular engagement assembly between the distal flange and the engagement face of the end-cap is achieved;
    wherein the plug and collar are individually configurable between their respective engaged and disengaged configurations.

2. The closure assembly according to claim 1 comprising a hydraulically operable plug drive piston assembly arranged to axially position the central housing relative to the end-cap whereby the plug is configurable between its engaged and disengaged configurations.

3. The closure assembly according to claim 2 comprising a plug locking means arrangeable between first and second positions while the plug remains in the engaged configuration to hold the central housing and the end-cap relatively positioned whereby when hydraulic pressure is removed from the hydraulically operable plug drive piston assembly the plug is held in its engaged configuration in the first position but allowed to disengage in the second position.

4. The closure assembly of claim 3 wherein the first coaxial tubular engagement assembly comprises one or more elastomeric washers, each arranged to provide a fluid tight seal between the outer face of the central housing and said inner face of said pipe in use, when axially compressed.

5. The closure assembly according to claim 4 wherein the first coaxial tubular engagement assembly comprises anti-extrusion assemblies at distal and proximal faces of each elastomeric washer.

6. The closure assembly according to claim 5 wherein the first coaxial tubular engagement assembly comprises one or more collet assemblies, each arranged to radially expand when axially compressed, whereby said inner face of said pipe is gripped in use.

7. The closure assembly of claim 1 wherein the collar carries a second coaxial tubular engagement assembly extending axially between a distal rim of the collar and the engagement face of the end-cap, and positioned at an inner face of the collar between the collar and said outer face of said pipe in use, wherein the second coaxial tubular engagement assembly, when axially compressed, is configured to grip and seal to said outer face of said pipe, and wherein configuration of the collar from its disengaged to its engaged configuration is actuated by axial movement of the central housing towards the end-cap whereby axial compression of the second tubular engagement assembly between the distal rim of the collar and the engagement face of the end-cap face is achieved.

8. The closure assembly according to claim 7 comprising a hydraulically operable drive piston arrangement configured to axially position the collar relative to the end-cap whereby the collar is configurable between its engaged and disengaged configurations.

9. The closure assembly according to claim 8 comprising a collar locking means arrangeable between first and second positions while the plug remains in the engaged configuration to hold the collar and the end-cap positioned relative to each other whereby when hydraulic pressure is removed from the hydraulically operable drive piston arrangement the collar is held in its engaged configuration in the first position but allowed to disengage in the second position.

10. The closure assembly according to claim 7 wherein the second coaxial tubular engagement assembly comprises one or more collet assemblies, each arranged to radially expand when axially compressed, whereby said outer face of said pipe are gripped in use.

11. The closure assembly according to claim 10, wherein each collet assembly of the first coaxial tubular engagement assembly is substantially aligned with a collet assembly of the second coaxial tubular engagement assembly.

12. The closure assembly according to claim 10 wherein the second coaxial tubular engagement assembly comprises one or more elastomeric washers, each arranged to provide a fluid tight seal between the inner face of the collar and said outer face of said pipe in use, when axially compressed.

13. The closure assembly according to claim 12 wherein the second coaxial tubular engagement assembly comprises anti-extrusion assemblies at distal and proximal faces of each elastomeric washer.

14. A method of providing a fluid-tight termination at an end of a pipe having an inner face and an outer face, the method comprising:
providing a closure assembly configured to have an annular space adapted to receive the end of the pipe when the plug and collar are in their respective disengaged configurations,
sliding the plug and collar of the closure assembly, each in their disengaged configurations, respectively into and over the end of the pipe whereby the pipe is positioned within the annular space of the closure assembly,
configuring the plug into its engaged configuration to grip the inner face of the pipe and to provide a fluid tight seal against the inner face of the pipe by hydraulically operated a first axial piston drive to axially compress a plug engagement assembly,
configuring the collar into its engaged configuration to grip the outer face of the pipe and to provide a fluid tight seal against the outer face of the pipe by hydraulically operated a second axial piston drive independently of the first piston drive to axially compress a collar engagement assembly,
whereby the closure assembly provides fluid-tight, pressure resistant termination of the pipe end.

15. The method according to claim 14 wherein the plug and collar are configured into their respective engaged configurations by hydraulically operating the first and second piston drives of the closure assembly actuated through hydraulic pressure lines operably connected to hydraulic inlet ports of the closure assembly.

16. The method according to claim 15 wherein the plug and collar are locked into their respective engaged configurations in which the hydraulic pressure lines are configured to be disconnected from the hydraulic inlet ports to leave the closure assembly providing fluid-tight, pressure resistant termination of the pipe end.

17. The method according to any one of claims 14 to 16 wherein the end of the pipe to be provided with a fluid-tight termination is in a hostile environment.

18. The method according to claim 17 wherein the method is carried out by a remote operation.

19. The method of claim 14 further comprising locking the collar into its engaged configuration by tightening a collar locking ring against a proximal face of an end cap body, whereby the hydraulic pressure lines may be disconnected from the hydraulic inlet ports to leave the closure assembly providing fluid-tight, pressure resistant termination of the pipe end.

20. The method of claim 14 wherein configuring the plug into its engaged position to grip the inner face of the pipe further comprises causing one or more collet assemblies of the plug engagement assembly to radially expand and grip the pipe inner surface, and further causing two or more elastomeric washers of the plug engagement assembly to radially expand and form a fluid tight seal against the pipe inner face and wherein configuring the collar into its engaged configuration to grip the outer face of the pipe and to provide a fluid tight seal against the outer face of the pipe further comprises causing one or more collet assemblies of the collar engagement assembly to radially expand and grip the pipe outer surface, and further causing two or more elastomeric washers of the collar engagement assembly to radially expand and form a fluid tight seal against the pipe outer face.

21. A closure assembly for terminating an end of a pipe, the closure assembly comprising:
an end-cap holding and having fluid-tight connection to a mutually coaxial cylindrical plug and circular collar,
the plug and the collar being configurable between respective engaged and disengaged configurations and mutually spaced to provide an annular space therebetween when the plug and collar are in their disengaged configurations,
the annular space arranged to receive an end of a pipe arranged coaxially with the plug and collar, the plug and collar being respectively slidable into and over said end of said pipe in use, the plug, when in its engaged configuration, configured to grip an inner face of said pipe and to provide a fluid tight seal against said inner face of said pipe, the collar, when in its engaged configuration, configured to grip an outer face of said pipe and to provide a fluid tight seal against said outer face of said pipe;

wherein the plug comprises a central housing carrying a first coaxial tubular engagement assembly extending axially between a distal flange of the central housing and an engagement face of the end-cap, and positioned between the outer face of the central housing and said inner face of said pipe in use, wherein the first coaxial tubular engagement assembly, when axially compressed, is configured to grip and seal to said inner face of said pipe, whereby configuration of the plug from its disengaged to its engaged configuration is actuated by axial movement of the central housing towards the end-cap whereby axial compression of the first tubular engagement assembly between the distal flange and the engagement face of the end-cap is achieved;

wherein the first coaxial tubular engagement assembly comprises: (a) one or more collet assemblies, each arranged to radially expand when axially compressed, whereby said inner face of said pipe is gripped in use, and (b) two or more elastomeric washers, each arranged to provide a fluid tight seal between the outer face of the central housing and said inner face of said pipe in use, when axially compressed.

22. The closure assembly of claim 21, wherein:

the collar carries a second coaxial tubular engagement assembly extending axially between a distal rim of the collar and the engagement face of the end-cap, and positioned at an inner face of the collar between the collar and said outer face of said pipe in use, wherein the second coaxial tubular engagement assembly, when axially compressed, is configured to grip and seal to said outer face of said pipe, and wherein configuration of the collar from its disengaged to its engaged configuration is actuated by axial movement of the central housing towards the end-cap whereby axial compression of the second tubular engagement assembly between the distal rim of the collar and the engagement face of the end-cap face is achieved;

the second coaxial tubular engagement assembly comprising (a) one or more collet assemblies, each arranged to radially expand when axially compressed, whereby said outer face of said pipe is gripped in use, (b) two or more elastomeric washers, each arranged to provide a fluid tight seal between the inner face of the collar and said outer face of said pipe in use, when axially compressed, and (c) anti-extrusion assemblies at distal and proximal faces of each elastomeric washer.

23. The closure assembly of claim 22, wherein each anti-extrusion assembly comprises inverse collets adapted to radially expand when axially compressed.

24. The closure assembly of claim 22, wherein the elastomeric washers of the second coaxial tubular engagement assembly are axially positioned opposite respective corresponding ones of the elastomeric washers of the first coaxial tubular engagement assembly.

* * * * *